(12) United States Patent
Yabuki et al.

(10) Patent No.: US 7,442,367 B2
(45) Date of Patent: Oct. 28, 2008

(54) PRODUCTION METHOD FOR ZEOLITE SHAPED BODY AND PRODUCTION METHOD FOR ZEOLITE LAYERED COMPOSITE

(75) Inventors: Miyuki Yabuki, Nagoya (JP); Kenji Suzuki, Nagoya (JP); Shinji Nakamura, Nagoya (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 811 days.

(21) Appl. No.: 11/052,694

(22) Filed: Feb. 7, 2005

(65) Prior Publication Data

US 2005/0148457 A1 Jul. 7, 2005

Related U.S. Application Data

(63) Continuation of application No. PCT/JP03/10373, filed on Aug. 15, 2003.

(30) Foreign Application Priority Data

Aug. 16, 2002 (JP) .............................. 2002-237692

(51) Int. Cl.
*C01B 39/04* (2006.01)
(52) U.S. Cl. ..................... 423/703; 423/704; 502/4; 502/60; 502/64; 502/71; 502/77
(58) Field of Classification Search ............... 423/703, 423/704, 705; 502/4, 60, 64, 71, 77
See application file for complete search history.

(56) References Cited

U.S. PATENT DOCUMENTS

| | | | | |
|---|---|---|---|---|
| 3,702,886 A | * | 11/1972 | Argauer et al. | 423/705 |
| 4,375,458 A | * | 3/1983 | Dwyer et al. | 423/705 |
| 4,495,166 A | * | 1/1985 | Calvert et al. | 423/703 |
| 4,680,170 A | * | 7/1987 | Lowe et al. | 423/703 |
| 4,699,892 A | | 10/1987 | Suzuki | |
| 4,800,187 A | | 1/1989 | Lachman et al. | |
| 5,164,169 A | | 11/1992 | Rubin | |
| 5,675,050 A | | 10/1997 | Des Courieres et al. | |
| 6,667,265 B1 | * | 12/2003 | Tomita et al. | 502/4 |
| 2003/0039609 A1 | | 2/2003 | Tomita et al. | |

FOREIGN PATENT DOCUMENTS

| | | |
|---|---|---|
| EP | 1 061 046 | 12/2000 |
| JP | 59-213615 | 12/1984 |
| JP | 60-028826 | 2/1985 |
| JP | 01-148771 | 6/1989 |
| JP | 06-032610 | 2/1994 |
| JP | 7-505333 | 6/1995 |
| JP | 11-511685 | 10/1999 |
| JP | 2001-114511 | 4/2001 |
| JP | 2001-40532 | 9/2002 |
| WO | 93/19841 | 10/1993 |
| WO | 96/01683 | 1/1996 |
| WO | 00/23378 | 4/2000 |

OTHER PUBLICATIONS

30th Autumn Annual Meeting (by the Society of Chemical Engineers), pp. 164, (1997).
S. Shimizu et al., Chem. Letter, 1996, pp. 403.

* cited by examiner

*Primary Examiner*—David M Brunsman
(74) *Attorney, Agent, or Firm*—Burr & Brown

(57) ABSTRACT

The present invention discloses a production method for a zeolite shaped body in which a tetrapropylammonium hydroxide (TPAOH) solution and tetrapropylammonium bromide (TPABr) are added to a silica sol, an obtained prepared solution is heated under a condition that crystallization and/or precipitation does not occur in the prepared solution in a sealed vessel, the heated prepared solution is dried, an obtained dry gel is shaped, and the shaped dry gel is subjected to crystallization treatment in steam, and it is possible to efficiently produce a zeolite shaped body on which a zeolite membrane can be formed and maintained without generating any crack, and which satisfies both reduction of pressure loss and maintenance or improvement of mechanical strength, when used as a gas separation membrane such as a molecular sieve membrane or a pervaporation membrane.

14 Claims, 3 Drawing Sheets

PRODUCTION METHOD FOR ZEOLITE SHAPED BODY AND PRODUCTION METHOD FOR ZEOLITE LAYERED COMPOSITE

CROSS REFERENCE TO RELATED APPLICATION

This application is a CONTINUATION APPLICATION of pending prior International Application No. PCT/JP03/10373, having an international filing date of Aug. 15, 2003, entitled PROCESS FOR PRODUCING ZEOLITE MOLDING AND PROCESS FOR PRODUCING ZEOLITE LAMINATE COMPOSITE, and claims the benefit of Japanese Application 2002-237692, filed Aug. 16, 2002, the entireties of which are incorporated herein by reference.

TECHNICAL FIELD

The present invention relates to a production method for a zeolite shaped body and a production method for a zeolite layered composite. More particularly, the present invention relates to an efficient production method for a zeolite shaped body capable of forming and maintaining a zeolite membrane thereon without causing crack, and satisfactorily reducing pressure loss and maintaining or improving mechanical strength when it is used as a gas separation membrane of a molecular sieve membrane or a pervaporation membrane and the like, and a production method for a zeolite layered composite.

BACKGROUND ART

Recently, a zeolite shaped body composed of particles of zeolite has been widely used for catalysts, catalyst carriers, adsorbents and the like in addition to molecular sieve membranes (gas separation membranes, pervaporation membranes). Also, this zeolite membrane may be used after having been formed on a porous substrate as a zeolite layered composite. In these situations, there have been proposed methods for producing various zeolite layered composites.

For example, proposed are methods wherein glass, mullite, cordierite type ceramic, alumina, silica or the like is used, or the ones wherein a metal or another substrate coated with an inorganic material is used as the substrate of the zeolite membrane (JP-A-59-213615).

Moreover, composites which thin membrane of cage-type zeolite is united with one surface of porous support body of a metal, inorganic, or polymer substance, are proposed (JP-A-60-28826). Among them, those having a high affinity to a gel material are proposed as especially preferable ones for the support body to be used and practically, it has been proposed to use the one called with tradename: No. 7930 manufactured by Coning Glass Works Co., generally called as Vycor glass, as especially preferable one.

Furthermore, a method proposed (JP-A-1-148771) relates to a method for crystallization of zeolite on the surface of a monolithic ceramic support body as a substrate which may have an oxide composition containing 45 to 4% by mass of silica, 8 to 45% by mass of alumina, and 7 to 20% by mass of magnesia; and practically proposed is a sintered monolithic support body of cordierite, glass, or glass ceramic.

Furthermore, another proposed production method (JP-A-6-32610) relates to a production method for an A type or faujasite type zeolite membrane using a substrate of a material mainly containing silicon dioxide. This method aims to solve the problem of inferior adhesion of the zeolite membrane to a substrate, wherein a zeolite membrane is used as a substrate itself and the surface of the substrate is made to be a zeolite membrane from its constitution, synthesis and adhesion can simultaneously be carried out to simplify the processes. To be practically, a substrate made of borosilicate glass, quartz glass, silica alumina, mullite or the like is proposed.

As described above, various zeolite layered composites each obtained by layering or forming a zeolite membrane on a substrate have heretofore been proposed, but these composite have the following problems.

That is, as shown in FIG. 2, a thermal expansion coefficient of zeolite shows a quite complicated behavior. It is an extremely lower value at a temperature to about 200° C., and it is a negative coefficient value at temperature further higher than that. Therefore, when the zeolite membrane is used at a temperature exceeding 200° C., its thermal expansion difference from the substrate, for example, alumina-based substrate becomes extremely large, resulting in the formation of cracks from the thermal stress in the zeolite membrane.

Moreover, depending on the type of the zeolite membranes, when the zeolite membrane is synthesized, a template or a crystallization promoting agent is required to be added. In the case of zeolite membrane containing the template, the template is removed by calcining it at about 500° C., however, as shown by a thermal expansion curve of MFI type zeolite, the thermal expansion behavior (thermal expansion curve before calcining in FIG. 3) of the zeolite membrane containing the template is significantly different from that (thermal expansion curve after the calcining in FIG. 3) of the zeolite membrane without template, so that the thermal expansion difference becomes extremely wide between a substrate such as an alumina substrate and the zeolite membrane, and cracks are caused in the zeolite membrane by the thermal stress during calcining.

To such problems, above proposed examples cannot be sufficient countermeasures.

Moreover, as a double layer structure of the substrate and the zeolite membrane, there has been proposed an asymmetric membrane comprising: a macro porous layer substantially formed only of a molecular sieve crystal having a prescribed thickness; and an upper layer for molecule separation, formed substantially only of the same type of molecular sieve crystal as that of the material of the macro porous layer, having a prescribed thickness and prescribed effective diameter of fine pores (JP-K-7-505333). There has been proposed a structure composed of three layers; a carrier, an intermediate layer, and an upper layer and in which the intermediate layer and the upper layer contain prescribed crystalline molecular sieves (JP-K-11-511685). Moreover, there has been proposed a zeolite composite membrane produced by coating a zeolite membrane containing the template on a porous zeolite shaped body containing the template, and thereafter calcining the resultant to remove the template therefrom and form the membrane simultaneously (International Laid-open Pamphlet No. WO 00/23378). These membranes and structures are superior in that a pore size can be precisely adjusted, and the formation of cracks can be effectively prevented.

However, when these membranes or structures (zeolite layered composite) are used as a substrate for a gas separation membrane such as a molecular sieve membrane or a pervaporation membrane, it is required to improve the efficiency of the use by reducing pressure loss of during gas or liquid pass through the membrane or the substrate. However, it is extremely difficult to obtain the one capable of satisfying both reduction of pressure loss and maintenance or improvement of mechanical strength of the substrate for supporting the zeolite membrane since the mechanical strength is decreased if one makes the dimension of the substrate particles larger which is a main cause for bringing an increase of the pressure loss (The reduction in the pressure loss of the substrate has an antinomic relation to the improvement in the mechanical strength of the substance). Thus, no one has hitherto succeeded in obtaining the membranes or the structures capable of satisfying both reduction of pressure loss and maintenance or improvement of mechanical strength.

Moreover, in the Proceedings of the 30-th Autumn Annual Meeting for presenting Researches by the Society of Chemical Engineers, p. 164 (1997), a production method for zeolite powder has been proposed in which a desired prepared solution is aged at a prescribed temperature for a prescribed time, so that the amount of obtained zeolite powder can be increased. By S. Shimizu et al., Chem. Lett., 1996, 403, it has been proposed that the prepared solution is allowed to stand at room temperature overnight before obtaining dry gel, and in order to promote crystallization of zeolite. However, the proposals cannot be applied to the zeolite substrate (shaped body) which satisfies the reduction of the pressure loss and the improvement of the mechanical strength in the present situations.

DISCLOSURE OF THE INVENTION

To solve the problem, the applicant has proposed a production method for a zeolite shaped body in which a prepared solution obtained by adding a tetrapropylammonium hydroxide (TPAOH) solution and tetrapropylammonium bromide (TPABr) to a silica sol is heated, kneaded, and dried, and the obtained dry gel is shaped, and subjected to crystallization treatment (Japanese Patent Application No. 2001-40532).

In the production method for the zeolite shaped body, constituted in this manner, it is possible to produce the zeolite shaped body on which a zeolite membrane can be formed and maintained without causing any crack, and which satisfies both reduction of pressure loss and maintenance or improvement of mechanical strength, when used as a gas separation membrane such as a molecular sieve membrane or a pervaporation membrane or the like. In the above-described production method, when a ratio of the tetrapropylammonium hydroxide (TPAOH) solution with respect to a total amount of tetrapropylammonium ion (TPA) is increased, the particle diameter of the zeolite shaped body can be reduced.

The present invention has further improved the above-described production method for the zeolite shaped body; thus, an object thereof is to provide a production method for a zeolite shaped body, and a production method for a zeolite layered composite wherein the particle diameter can be reduced even in a case where a ratio of a comparatively expensive tetrapropylammonium hydroxide (TPAOH) solution is reduced with respect to a total amount of tetrapropylammonium ion (TPA), wherein the zeolite membrane can be formed and maintained without causing any crack, and wherein a zeolite shaped body satisfying both reduction of pressure loss and maintenance or improvement of mechanical strength when used as a gas separation membrane such as a molecular sieve membrane or a pervaporation membrane can be efficiently produced.

To achieve the above-described object, according to the present invention, there is provided a production method for a zeolite shaped body, characterized by comprising the steps of: adding a tetrapropylammonium hydroxide (TPAOH) solution and tetrapropylammonium bromide (TPABr) to a silica sol in such a manner that mixing ratios [TPAOH/(TPAOH+TPABr) and TPABr/(TPAOH+TPABr)] of tetrapropylammonium hydroxide (TPAOH) and tetrapropylammonium bromide (TPABr) with respect to a total amount of tetrapropylammonium ions (TPA) are adjusted in ranges of 0 to 99 mol % and 100 to 1 mol %; heating thus prepared solution in a sealed vessel under the condition that crystallization and/or precipitation does not occur in the prepared solution; drying the heated prepared solution; shaping an obtained dry gel; and crystallizing the shaped dry gel in steam.

Moreover, in the present invention, it is preferable that a relation between a heating temperature and a heating time in the heating step can satisfy the one represented by the following equation (2):

$$10^{(-x/26+3.477)} \leq y \leq 10^{(-x/67+3.477)} \quad (2),$$

(wherein x denotes the heating temperature (° C.), y denotes the heating time (hour), 0<x, and 0.1≦y).

Furthermore, in the present invention, it is referable to be 40≦x≦140, and 1≦y≦500 in the equation (2).

Additionally, in the production method for the zeolite shaped body of the present invention, a source of the tetrapropylammonium ions (TPA) may comprise only TPABr. In the present invention, the step of drying the prepared solution preferably comprises static drying, drying while kneading or direct spray drying.

It is preferable that, in the present invention, zeolite composing a zeolite shaped body is of an MFI type, and that the zeolite shaped body has a bending strength of 1.5 MPa or more.

Moreover, according to the present invention, there is provided a production method for a zeolite layered composite of the present invention, characterized by comprising the steps of: producing a zeolite shaped body by the above-described production method for the zeolite shaped body; and layering a zeolite membrane on the obtained zeolite shaped body.

BEST MODE FOR CARRYING OUT THE INVENTION

Figure 1:
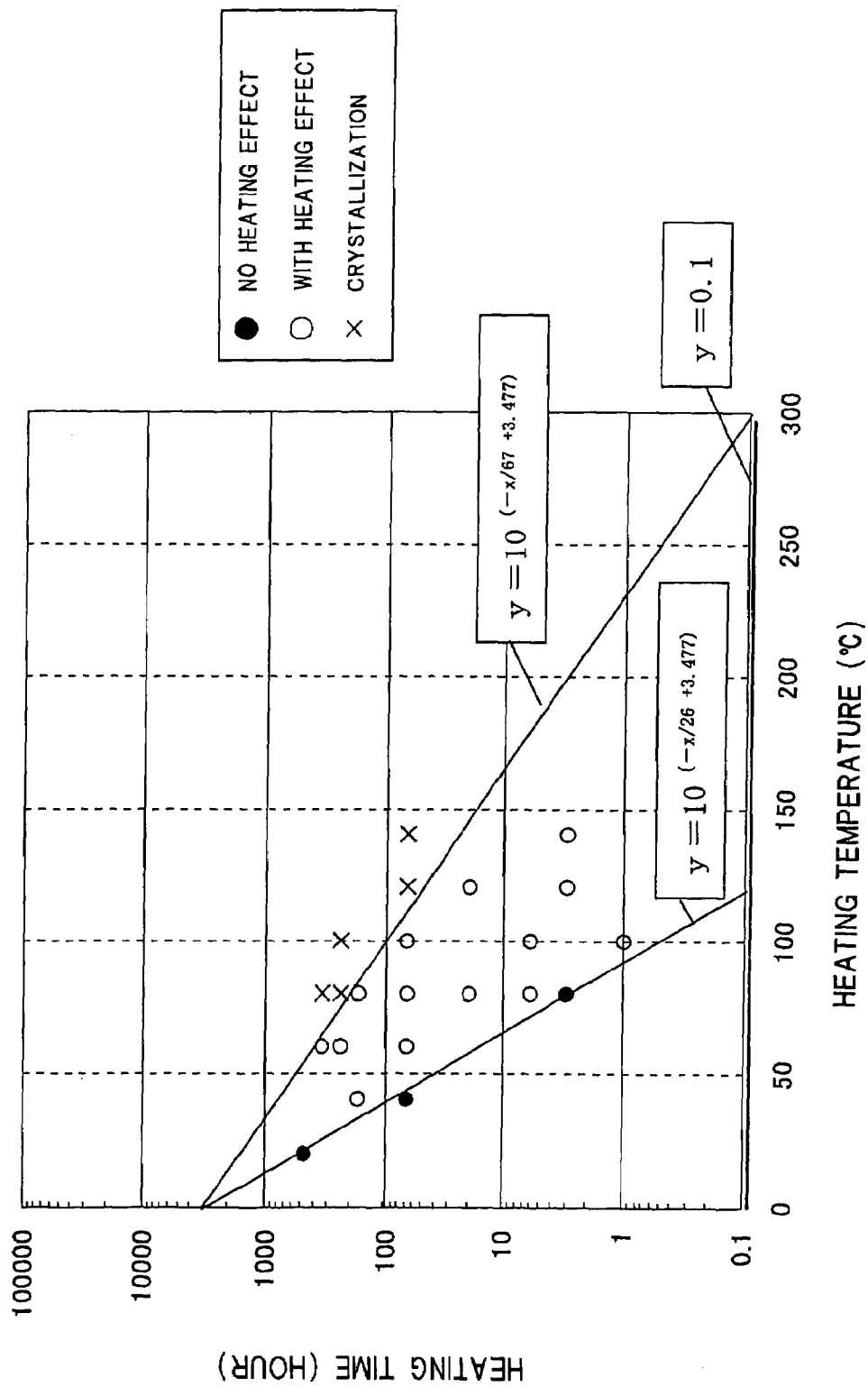
FIG. 1 is a graph showing a relation between a heating temperature and a heating time in a heating step in a production method for a zeolite shaped body of the present invention.
Figure 2:
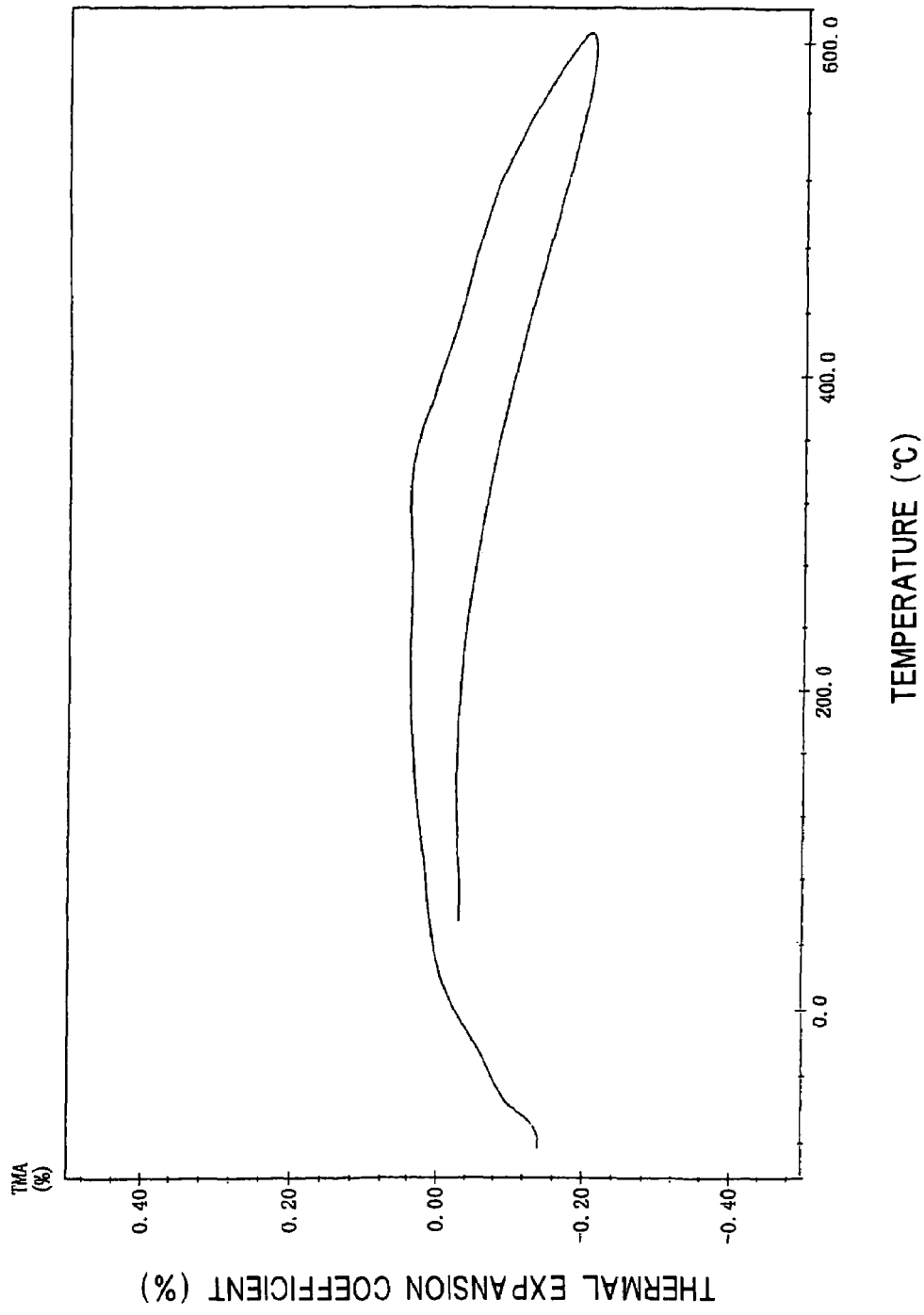
FIG. 2 is a graph showing a thermal expansion curve of MFI type zeolite.
Figure 3:
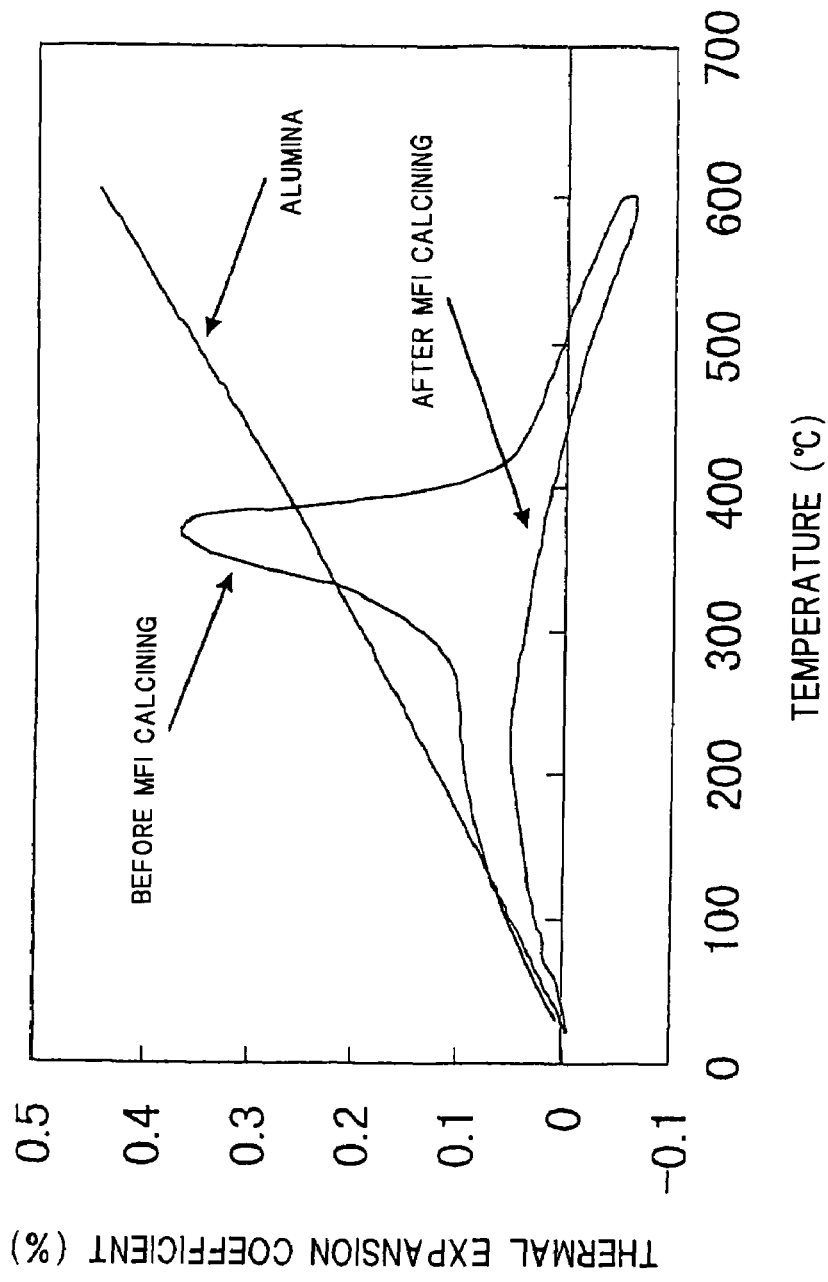
FIG. 3 is a graph showing a thermal expansion curve of MFI type zeolite (before and after calcined) and alumina.

A mode for carrying out a zeolite shaped body of the present invention will be concretely described hereinafter.

According to one mode for carrying out the present invention, there is provided a production method for a zeolite shaped body, in which: a tetrapropylammonium hydroxide (TPAOH) solution and tetrapropylammonium bromide (TPABr) are added to a silica sol in such a manner that a mixing ratio (TPA/SiO$_2$) of tetrapropylammonium ions (TPA) and the silica sol may satisfy a prescribed molar ratio, and mixing ratios [TPAOH/(TPAOH+TPABr) and TPABr/(TPAOH+TPABr)] of tetrapropylammonium hydroxide (TPAOH) and tetrapropylammonium bromide (TPABr) with respect to a total amount of tetrapropylammonium ions (TPA) are adjusted in ranges of 0 to 99 mol % and 100 to 1 mol %; a thus prepared solution is heated in a sealed vessel under a condition that crystallization and/or precipitation does not occur in the prepared solution; the heated prepared solution is dried; an obtained dry gel is shaped; and the shaped dry gel is crystallized in steam.

As to the above-described mixing ratio (TPA/SiO$_2$ molar ratio) of the tetrapropylammonium ions (TPA) and the silica sol, when the molar ratio is within a range of 0.015 to 0.08, an average particle diameter of the zeolite shaped body does not change, and bending strength has a value of 1.5 MPa or more (strength at which the shaped body does not collapse under a hydrothermal synthesis environment of a zeolite membrane, and the shaped body does not collapse even after the membrane is formed) necessary for a substrate on which a zeolite layered composite can be formed. Therefore, the ratio may be adjusted in any ratio within the above-mentioned range.

Concretely, in the present embodiment, first the TPA/SiO$_2$ molar ratio is adjusted to 0.04 at which the bending strength becomes maximal to obtain the prepared solution. In the present embodiment, a source of propylammonium ions (TPA) may comprise only TPABr.

Moreover, the prepared solution may contain sodium hydroxide as long as the TPA/SiO$_2$ molar ratio of the prepared solution, and the mixing ratio of TPAOH and TPABr with respect to the total amount of TPA are kept at the prescribed amounts. By employing this constitution, pH of the prepared solution can be adjusted. An alkali source other than sodium hydroxide, such as potassium hydroxide may be added.

Next, the prepared solution is charged in a vessel of a material which does not cause reaction with the prepared solution, for example, a vessel made of fluororesin or the like, and the fluororesin vessel charged with the prepared solution is set in a sealed vessel, and sealed. As the sealed vessel, a pressure vessel is preferably usable because an inner pressure sometimes rises in a heat treatment described later. In the present embodiment, the prepared solution may be held in a sealed manner. For example, the prepared solution may be charged and sealed directly in the sealed vessel.

Next, the prepared solution in the sealed vessel is heated under a condition that crystallization and/or precipitation does not occur in the prepared solution. As heating means, a drying oven, a constant-temperature bath or the like is preferably usable because it is easy to control the prepared solution at prescribed temperature. Heating means such as hot water and the like may be used in the heat treatment.

There is no restriction as to the condition of the heat treatment to be performed in the present embodiment as long as the crystallization and/or precipitation does not occur in the prepared solution. As shown in FIG. 1, zeolite shaped bodies were produced under different conditions, the obtained zeolite shaped bodies were evaluated, and the condition of the heat treatment is calculated from the results. Resultantly, it is preferably found that, as the condition that the crystallization and/or precipitation does not occur in the prepared solution, a relation between a heating temperature and a heating time in the heating step is the one represented by the following equation (3):

$$10^{(-x/26+3.477)} < y < 10^{(-x/67+3.477)} \quad (3),$$

(wherein x denotes the heating temperature (° C.), y denotes the heating time (hour), 0<x, and 0.1≦y).

Furthermore, in the present embodiment, it is further preferable to be 40≦x≦140, and 1≦y≦500 in the above equation (3).

As shown in FIG. 1, when the heating time (y) is $10^{(-x/26+3.477)}$ or less, an effect of the decreasing of the particle size by the heat treatment is not obtained. When the heating time (y) is $10^{(-x/67+3.477)}$ or more, crystallization of zeolite sometimes occurs in the prepared solution during the heat treatment. The conditions of the heat treatment in the present embodiment were set to a heating temperature of 60° C., and a heating time of 68 hours.

After the completion of heat treatment, the prepared solution is taken out together with the sealed vessel from the drying oven, and the prepared solution is cooled at room temperature. During the cooling, the solution may be kept in the sealed vessel, or taken out of the sealed vessel.

Next, the cooled prepared solution is dried to obtain a dry gel. There is no particular restriction as to a method for drying the prepared solution as long as moisture of the prepared solution can be satisfactorily removed. Examples of the concrete drying method include drying with a static dryer, direct spray drying of a sol by a spray drier or the like, and drying simultaneous with stirring and kneading. Preferable examples of the drying simultaneous with the stirring and kneading include a method in which the prepared solution is charged in a fluororesin beaker, stirred with a magnetic stirrer, thereafter heated in a constant-temperature bath set at a prescribed temperature, and continuously manually kneaded with stirring using a fluororesin rod to vaporize water. The stirring and kneading at this time may be performed with a heating kneader or the like. When the prepared solution is gelled, the solution may be manually kneaded with stirring from the beginning.

Next, the obtained dry gel is shaped into a prescribed shape by uniaxial pressing with a die (total pressure of 196 MPa), and thereafter cold isostatic pressing is performed to obtain a dry gel shaped body. At this time, it is preferable to adjust the pressure of the cold isostatic pressing in a range of 68 to 686 MPa so as to obtain a dry gel shaped body having a desired density.

Next, the dry gel shaped body obtained as described above is set on a fluororesin plate in such a manner as to be prevented from being contacted by water in a stainless steel-made pressure vessel which is provided with a fluororesin inner cylinder and in which distilled water having a weight equal to the weight of a dry gel shaped body is charged, reacted in an oven at 180° C. for ten hours under a spontaneous steam pressure, subjected to crystallization treatment. Thereafter, the shaped body is sufficiently washed with hot water at 80° C., and dried in a drying oven at 80° C. to obtain a zeolite shaped body. There is no restriction as to the amount of the distilled water at this time from a relation between the shaped body and the distilled water as long as the amount is not less than an amount for reaching a saturated steam pressure in the volume of a pressure vessel for use. There is no particular restriction as to reaction temperature and time as long as they are not less than 130° C. and two hours because the crystallization is promoted under said conditions. The washing and drying steps performed after the crystallization may be omitted.

By this constitution, the zeolite shaped body can be efficiently produced on which the zeolite membrane can be formed and maintained without causing any crack, and which satisfies both reduction of pressure loss and maintenance or improvement of mechanical strength, when used as a gas separation membrane such as a molecular sieve membrane or a pervaporation membrane or the like.

Moreover, in the present embodiment, zeolite constituting the zeolite shaped body is preferably of an MFI type. The zeolite shaped body produced by the present embodiment is preferably usable as a porous substrate which supports the zeolite membrane.

Moreover, when the prepared solution is prepared, as the mixing ratio [TPAOH/(TPAOH+TPABr)] of tetrapropylammonium hydroxide (TPAOH) with respect to the total amount of tetrapropylammonium ions (TPA) increases, a particle diameter of the obtained zeolite shaped body decreases. Moreover, the mechanical strength can be maintained/improved, but tetrapropylammonium hydroxide (TPAOH) is expensive, compared with tetrapropylammonium bromide (TPABr). In the present embodiment, even with the use of the prepared solution prepared in such a manner as to increase the amount of comparatively inexpensive tetrapropylammonium bromide (TPABr), further even in a case where expensive TPAOH is not used, the step of heating the above-described prepared solution in the sealed vessel is performed. Accordingly, a crystal particle diameter can be controlled, and the zeolite shaped body having a desired characteristic can be produced at low cost.

Next, one embodiment of a production method for a zeolite layered composite of the present invention will be described. The production method for the zeolite layered composite of the present embodiment is characterized in that a zeolite shaped body is produced by the above-described production method for the zeolite shaped body, and a zeolite membrane is layered on the obtained zeolite shaped body.

Preferable examples of a method for layering the zeolite membrane on the zeolite shaped body include a method in which the zeolite shaped body obtained by the above-described producing method is immersed in a solution having a composition identical or similar to that of the prepared solution, and a zeolite membrane containing a template is formed on the zeolite shaped body as well by synthesizing hydrothermally so as to obtain a layered zeolite shaped body containing the zeolite shaped, body and the zeolite membrane containing the template, and the layered body is calcined to simultaneously remove the template. The zeolite shaped body and the zeolite membrane preferably comprise identical or similar zeolite.

By this constitution, the cracks of the zeolite membrane can be effectively prevented from being formed, and the zeolite layered composite can be produced which satisfies both reduction of pressure loss and maintenance or improvement of mechanical strength, when used as a gas separation membrane such as a molecular sieve membrane or a pervaporation membrane.

There is no restriction as to zeolite constituting the zeolite membrane for use in the present embodiment and, for example, MFI, AFI, DDR, BEA, FAU, LTA or the like is preferably used.

Moreover, when the template is required in forming the zeolite membrane, examples of the template include: tetrapropylammonium hydroxide (TPAOH) of tetrapropylammonium bromide (TPABr) to be contained in the zeolite membrane formed of MFI; hydroxide or bromide of tetraethyl ammonium (TEA) to be contained in the zeolite membrane formed of BEA or the like.

The present invention will be more concretely described hereinafter in accordance with examples, but the present invention is not limited to these examples

EXAMPLES 1 TO 11

To a 100 ml fluororesin-made vessel, about 30% by mass of a silica sol (manufactured by Nissan Chemical Industries, Ltd., trade name: Snowtex S), and tetrapropylammonium bromide (TPABr) (manufactured by Wako Pure Chemical Industries, Ltd.) were added with adjusting a mixing ratio (TPA/SiO$_2$) of tetrapropylammonium ions (TPA) and the silica sol to 0.04 in terms of a molar ratio. Furthermore, sodium hydroxide was added by an amount (mol) equal to an added amount of tetrapropylammonium bromide (TPABr) using about 2% by mass of an aqueous sodium hydroxide solution, and thus prepared solution was obtained.

The fluororesin-made vessel in which the prepared solution was placed was set in a stainless steel-made small-sized pressure vessel, and sealed. Next, the pressure vessel was placed in a drying oven heated beforehand, and heated. Heating temperature and time are shown in Table 1.

TABLE 1

| | Heating temp. (° C.) | Heating Time (hour) | Crystal structure after heating/ Kneading | Mechanical strength of shaped body | Average particle diameter (μm) |
|---|---|---|---|---|---|
| Example 1 | 60 | 68 | Amorphous | Satisfactory | 5.2 |
| Example 2 | 80 | 6 | Amorphous | Satisfactory | 4.1 |
| Example 3 | 80 | 20 | Amorphous | Satisfactory | 4.8 |
| Example 4 | 80 | 68 | Amorphous | Satisfactory | 3.5 |
| Example 5 | 80 | 164 | Amorphous | Satisfactory | 1.6 |
| Example 6 | 100 | 1 | Amorphous | Satisfactory | 7.9 |
| Example 7 | 100 | 6 | Amorphous | Satisfactory | 8.1 |
| Example 8 | 100 | 68 | Amorphous | Satisfactory | 1.9 |
| Example 9 | 120 | 3 | Amorphous | Satisfactory | 3.3 |
| Example 10 | 120 | 20 | Amorphous | Satisfactory | 2.8 |
| Example 11 | 140 | 3 | Amorphous | Satisfactory | 4.3 |
| Comp. Example 1 | — | — | Amorphous | Satisfactory | 12 |
| Comp. Example 2 | 80 | 236 | MFI | Brittle | — |
| Comp. Example 3 | 120 | 68 | MFI | Brittle | — |
| Comp. Example 4 | 140 | 68 | MFI | Brittle | — |

After the completion of heat treatment, the pressure vessel was taken out of a drying oven, and cooled until the prepared solution reached room temperature, the fluororesin-made vessel was placed in a water bath heated at 80° C., and the solution was heated under stirring with a magnetic stirrer.

As water of the prepared solution vaporized, viscosity of the prepared solution increased, and then the stirring and kneading was manually continued using a fluororesin-made stirring rod. Additionally, when the sol formed in the prepared solution was gelled from the beginning, the resultant was manually kneaded with stirring without using the magnetic stirrer. When any weight change from the vaporization of the water was not seen, the heating/kneading was finished, and white dry gel was obtained. As a result of X-ray diffraction, the obtained dry gel was amorphous.

This dry gel was ground in an agate mortar for about three hours, and an obtained powder was subjected to uniaxial pressing with a die (at a total pressure of 196 MPa), and shaped into a disc shape having a diameter of about 20 mm and a thickness of about 2 mm to obtain a shaped body. The shaped body was set in a 100 ml fluororesin-made vessel in which ion-exchange water was charged by (weight) about 1.5 times a weight of the shaped body in a state that there was no contact between the shaped body and the water, the fluororesin-made vessel was set in a stainless steel-made small-sized pressure vessel, and sealed, and the contents of the vessel were subjected to a reaction under a spontaneous steam pressure for 18 hours in a drying oven at 180° C. As a result of inspection by the X-ray diffraction, the reacted shaped body was MFI type zeolite. The shaped body was sufficiently washed with hot water at 80° C., dried in the drying oven at 80° C., and shaped into a zeolite shaped body.

A microstructure of a fractured surface of the zeolite shaped body obtained in this manner was observed with a scanning electron microscope (SEM), and an average particle diameter was determined. The determination results are shown in Table 1.

The zeolite shaped bodies produced by Examples 1 to 11 did not collapse, had satisfactory mechanical strengths, had small particle diameters after the steam process, and were effectively usable as substrates of zeolite composites and the like. Bending strengths of test pieces (Examples 1 to 11) were 1.5 MPa or more when measured. The bending strengths were measured in accordance with JIS R 1601.

COMPARATIVE EXAMPLE 1

To a 200 ml fluororesin-made vessel, about 30% by mass of a silica sol (manufactured by Nissan Chemical Industries, Ltd., trade name: Snowtex S), and tetrapropylammonium bromide (TPABr) (manufactured by Wako Pure Chemical Industries, Ltd.) were added with adjusting a mixing ratio (TPA/$SiO_2$) of tetrapropylammonium ions (TPA) and the silica sol to 0.04 in terms of a molar ratio. Furthermore, sodium hydroxide was added by an amount (mol) equal to an added amount of tetrapropylammonium bromide (TPABr) using about 2% by mass of an aqueous sodium hydroxide solution, and thus prepared solution was obtained.

The prepared solution was charged in a water bath heated at 80° C., and heated under stirring with a magnetic stirrer.

Water of the prepared solution vaporized, viscosity of the prepared solution increased, and then the stirring and kneading was manually continued using a fluororesin-made stirring rod. When any weight change from the vaporization of the water was not seen, the heating/kneading was finished, and white dry gel was obtained. As a result of X-ray diffraction, the obtained dry gel was amorphous.

This dry gel was ground in an agate mortar for about three hours, and an obtained powder was subjected to uniaxial pressing with a die (at a total pressure of 196 MPa), and shaped into a disc shape having a diameter of about 20 mm and a thickness of about 2 mm to obtain a shaped body. The shaped body was set in a 100 ml fluororesin-made vessel in which ion-exchange water was charged by (weight) about 1.5 times a weight of the shaped body in a state that there was no contact between the shaped body and the water, the fluororesin-made vessel was set in a stainless steel-made small-sized pressure vessel, and sealed, and the contents of the vessel were subjected to a reaction under a spontaneous steam pressure for 18 hours in a drying oven at 180° C. As a result of the X-ray diffraction, the reacted shaped body was MFI type zeolite. The shaped body was sufficiently washed with hot water at 80° C., dried in the drying oven at 80° C., and shaped into a zeolite shaped body.

A microstructure of a fractured surface of the zeolite shaped body obtained in this manner was observed with a scanning electron microscope (SEM), and an average particle diameter was determined from the photograph. The determination results are shown in Table 1.

The zeolite shaped body produced by Comparative Example 1 did not collapse, and had a satisfactory mechanical strength. However, the particle diameter after the steam process was as large as 12 μm, the mechanical strength was decreased, and therefore it was difficult to use as a substrate of a zeolite composite or the like.

COMPARATIVE EXAMPLES 2 TO 4

To a 100 ml fluororesin-made vessel, about 30% by mass of a silica sol (manufactured by Nissan Chemical Industries, Ltd., trade name: Snowtex S), and tetrapropylammonium bromide (TPABr) (manufactured by Wako Pure Chemical Industries, Ltd.) were added with adjusting a mixing ratio (TPA/$SiO_2$) of tetrapropylammonium ions (TPA) and the silica sol to 0.04 in terms of a molar ratio. Furthermore, sodium hydroxide was added by an amount (mol) equal to an added amount of tetrapropylammonium bromide (TPABr) using about 2% by mass of an aqueous sodium hydroxide solution, and thus prepared solution was obtained.

A fluororesin-made vessel in which the obtained prepared solution was charged was set and sealed in a stainless steel-made small-sized pressure vessel. Next, the pressure vessel was set in a drying oven heated beforehand, and heated. Heating temperature and time are shown in Table 1.

After the completion of heat treatment, the pressure vessel was taken out from the drying oven and cooled until the prepared solution reached room temperature. In this case, the prepared solution was crystallized.

This prepared solution was moved into a 200 ml fluororesin-made vessel, the fluororesin-made vessel was placed in a water bath heated at 80° C., and the stirring and kneading was manually continued using a fluororesin-made stirring rod. When any weight change from the vaporization of the water was not seen, the heating/kneading was finished, and white dry gel was obtained. As a result of inspection of a crystal structure by X-ray diffraction, the obtained dry gel was MFI zeolite.

This dry gel was ground in an agate mortar for about three hours, and an obtained powder was subjected to uniaxial pressing with a die (at a total pressure of 196 MPa), however, a shaped body could not be obtained since the resultant was very brittle.

INDUSTRIAL APPLICABILITY

As described above, according to the present invention, there can be provided: a production method for a zeolite shaped body on which a zeolite membrane can be formed and maintained without causing any crack, and which satisfies both reduction of pressure loss and maintenance or improvement of mechanical strength, when used as a gas separation membrane such as a molecular sieve membrane or a pervaporation membrane or the like; and a production method for a zeolite layered composite.

The invention claimed is:

1. A production method for a zeolite shaped body, comprising the steps of:
   adding a tetrapropylammonium hydroxide (TPAOH) solution and tetrapropylarnmonium bromide (TPABr) to a silica sol in such a manner that mixing ratios [TPAOH/(TPAOH+TPABr) and TPABr/(TPAOH+TPABr)] of tetrapropylammonium hydroxide (TPAOH) and tetrapropylammonium bromide (TPABr) with respect to a total amount of tetrapropylammonium ions (TPA) are adjusted in ranges of 0 to 99 mol % and 100 to 1 mol %; heating thus prepared solution in a sealed vessel under a condition that crystallization and/or precipitation does not occur in the prepared solution; drying the heated prepared solution; shaping an obtained dry gel; and crystallizing the shaped dry gel in steam.

2. The production method for the zeolite shaped body according to claim 1, wherein a relation between a heating temperature and a heating time in the heating step is represented by the following equation (1):

$$10^{(-x/26+3.477)} \leq y < 10^{(-x/67+3.477)} \quad (1),$$

(wherein x denotes the heating temperature (° C.), y denotes the heating time (hour), 0<x, and 0.1≦y).

3. The production method for the zeolite shaped body according to claim 2, wherein x and y are $40 \leq x \leq 140$ and $1 \leq y \leq 500$ in the equation (1).

4. The production method for the zeolite shaped body according to claim 1, wherein a source of the tetrapropylammonium ions (TPA) comprises only tetrapropylammonium bromide (TPABr).

5. The production method for the zeolite shaped body according to claim 1, wherein the step of drying the prepared solution comprises static drying, drying while kneading or direct spray drying.

6. The production method for the zeolite shaped body according to claim 1, wherein a bending strength of the zeolite shaped body is 1.5 MPa or more.

7. The production method for the zeolite shaped body according to claim 1, wherein zeolite constituting the zeolite shaped body is of an MFI type.

8. A production method for a zeolite layered composite, comprising the steps of:
producing a zeolite shaped body by a production method for a zeolite shaped body, comprising the steps of: adding a tetrapropylammonium hydroxide (TPAOH) solution and tetrapropylammonium bromide (TPABr) to a silica sol in such a manner that mixing ratios [TPAOH/(TPAOH+TPABr) and TPABr/(TPAOH+TPABr)] of tetrapropylammonium hydroxide (TPAOH) and tetrapropylammonium bromide (TPABr) with respect to a total amount of tetrapropylammonium ions (TPA) are adjusted in ranges of 0 to 99 mol % and 100 to 1 mol %; heating thus prepared solution in a sealed vessel under a condition that crystallization and/or precipitation does not occur in the prepared solution; drying the heated prepared solution; shaping an obtained dry gel; and crystallizing the shaped dry gel in steam, and
layering a zeolite membrane on the obtained zeolite shaped body.

9. The production method for the zeolite layered composite according to claim 8, wherein a relation between a heating temperature and a heating time in the heating step is represented by the following equation (1):

$$10^{(-x/26+3.477)} \leq y < 10^{(-x/67+3.477)} \quad (1),$$

(wherein x denotes the heating temperature (° C.), y denotes the heating time (hour), $0 < x$, and $0.1 \leq y$).

10. The production method for the zeolite layered composite according to claim 9, wherein x and y are $40 \leq x \leq 140$ and $1 \leq y \leq 500$ in the equation (1).

11. The production method for the zeolite layered composite according to claim 8, wherein a source of the tetrapropylammonium ions (TPA) comprises only tetrapropylammonium bromide (TPABr).

12. The production method for the zeolite layered composite according to claim 8, wherein the step of drying the prepared solution comprises static drying, drying while kneading or direct spray drying.

13. The production method for the zeolite layered composite according to claim 8, wherein a bending strength of the zeolite shaped body is 1.5 MPa or more.

14. The production method for the zeolite layered composite according to claim 8, wherein zeolite constituting the zeolite shaped body is of an MFI type.

* * * * *